United States Patent [19]
McCall et al.

[11] Patent Number: 5,497,323
[45] Date of Patent: Mar. 5, 1996

[54] TRIP COMPUTER WITH RETROACTIVE RESET

[75] Inventors: Clark E. McCall, Ann Arbor; Joseph A. Heller, Brighton; James V. Clore, Howell; Joseph R. Pastorek, Highland; Jon M. Rathbun, Brighton, all of Mich.

[73] Assignee: General Motors Corporation, Detroit, Mich.

[21] Appl. No.: 167,101

[22] Filed: Dec. 16, 1993

[51] Int. Cl.⁶ .................................................. G06F 13/00
[52] U.S. Cl. ..................... 364/424.04; 364/561; 340/438
[58] Field of Search ......................... 364/424.04, 424.01, 364/424.03, 561, 431.01; 340/425.5, 438, 439

[56] References Cited

U.S. PATENT DOCUMENTS

| | | | |
|---|---|---|---|
| 4,344,136 | 8/1982 | Panik | 364/424 |
| 4,371,934 | 2/1983 | Wahl et al. | 364/424 |
| 4,373,116 | 2/1983 | Shimizu et al. | 179/1 SM |
| 4,642,787 | 2/1987 | McCarthy et al. | 364/561 |
| 4,663,718 | 5/1987 | Augello et al. | 364/444 |
| 4,862,395 | 8/1989 | Fey et al. | 364/561 |
| 5,267,159 | 11/1993 | O'Neall | 364/424.04 |
| 5,386,533 | 1/1995 | Morris | 395/425 |

Primary Examiner—Michael Zanelli
Attorney, Agent, or Firm—Anthony Luke Simon

[57] ABSTRACT

An apparatus comprising a sensor for sensing a signal indicative of vehicle travel, a reset button, a display, a computer controller coupled to the sensor, the reset button and the display, the computer controller including a memory, an input device for receiving the sensed signal, program control for updating and storing trip distance traveled responsive to the received signal, an input device for receiving a reset signal from the reset switch and program control for retroactively resetting the trip distance traveled to a value equal to distance travelled since a last vehicle ignition on responsive to the reset signal; and an output device for controlling the display to display the trip distance traveled.

6 Claims, 2 Drawing Sheets

5,497,323

TRIP COMPUTER WITH RETROACTIVE RESET

This invention relates to trip computers and more particularly a trip computer with a retroactive reset function.

BACKGROUND OF THE INVENTION

Various vehicles available today include electronically controlled trip computers, which provide for a vehicle operator information such as mileage travelled in a current automotive trip. Some trip computers also provide additional information of travel time on the trip, fuel consumption, mount of fuel remaining and fuel efficiency as in miles per gallon or kilometers per liter.

The trip computer typically resets trip mileage and trip time in response to an operator depression of a reset button. Some trip computers are offered in addition to standard equipment such as odometer, etc., while others include standard equipment such as an electronic odometer for permanently storing total vehicle travel miles.

One proposed implementation for a trip computer or trip odometer includes a feature that automatically resets the computer with every "ignition off" of the vehicle. Such an option could lead to undesirable resets if a stop is made in the middle of a trip and a reset is not desired at that particular stop.

SUMMARY OF THE PRESENT INVENTION

Advantageously, this invention provides a retroactive reset function for a trip computer/odometer. When using a trip computer, if the vehicle operator is at a stop (i.e., "ignition off" of the vehicle) at which the operator desires to reset the trip computer and forgets to reset the computer, that operator does not know the actual distance travelled since that stop. Advantageously, this invention allows for retroactive reset of a trip computer so that even if the operator forgets to reset the trip computer at a particular stop, the trip computer may be retroactively reset so that the output distance (i.e. mileage) and time, etc., indicate distance and time since the last stop.

Advantageously, this invention allows, during operation of a vehicle, for the retroactive reset of the vehicle trip computer to indicate the distance travelled since the latest "ignition on" of the vehicle. Advantageously, time travelled since the latest "ignition on" of the vehicle can also be retroactively reset. Advantageously, this invention provides retroactive reset of the trip computer functions without requiring that the trip computer be reset at every vehicle stop.

Advantageously, this invention provides an automotive trip computer with a dual purpose reset button. Advantageously according to this invention, the automobile trip computer's reset button can be used by an operator to command the trip computer to: (a) reset the trip computer to zero in a conventional manner; and/or (b) retroactively reset the trip computer to indicate the distance traveled since the last "ignition on" of the vehicle.

Advantageously, the carrying out of the above-stated advantages and functions of this invention is performed by an apparatus structurally comprising means for sensing a signal indicative of vehicle travel, a reset button, a display, a computer controller including a memory, means for receiving the sensed signal, means for updating and storing trip distance traveled responsive to the received signal, means for receiving a reset signal from the reset switch and means for retroactively resetting the trip distance traveled to a value equal to distance travelled since a last vehicle "ignition on" responsive to the reset switch signal, and means for controlling the display to display the trip distance traveled.

The practicing of this invention to achieve the above-stated advantages and functions is carried out according to the method of this invention comprising the steps of receiving a signal indicative of vehicle travel distance, responsive to the received signal, updating and determining a trip travel distance, receiving a signal from a reset button and responsive to the signal received from the reset button, retroactively resetting the trip travel distance to a distance travelled since a previous point in time and displaying the trip travel distance.

Advantageously, then, this invention comprises a method of operating an apparatus for maintaining and indicating trip data for a vehicle comprising the step of, responsive to an operator input, retroactively resetting the trip data to indicate data maintained since an "ignition on" of the vehicle.

Advantageously, this invention provides a trip computer display function responsive to depression of a reset button wherein when the reset button is depressed for a depression time period less than a first time threshold, a previous trip distance is displayed, when the reset button is maintained depressed wherein the depression time period is greater than the first time threshold but less than a second time threshold that is greater than the first time threshold, a zero trip distance is displayed, and when the reset button is maintained depressed wherein the depression time period is greater than the second time threshold, a retroactive reset trip distance is displayed.

A more detailed description of this invention and its operation and advantages is set forth below.

DETAILED DESCRIPTION OF THE INVENTION

Figure 1:
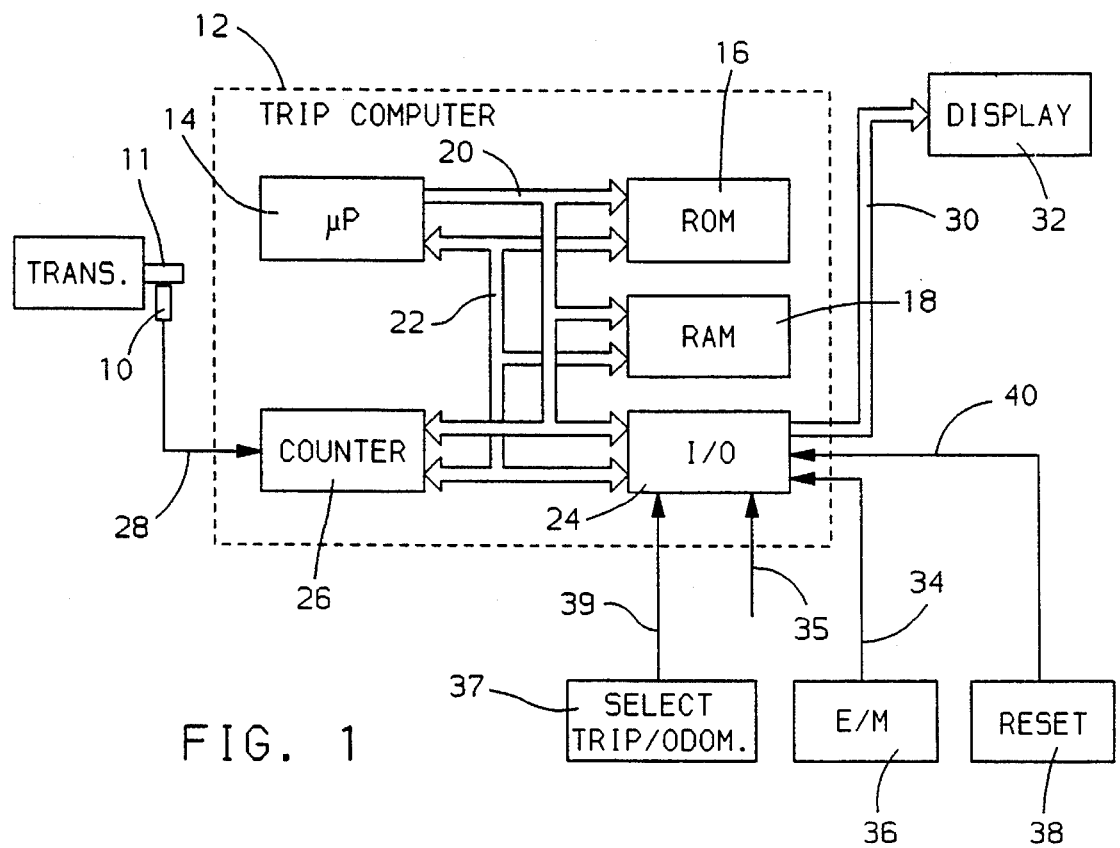
FIG. 1 is a schematic illustration of the apparatus of this invention.

Referring to FIG. 1, the schematic of the vehicle trip computer in which this invention is implemented is shown comprising trip computer 12, microprocessor 14, ROM and RAM 16 and 18 and internal counter 26 and input/output unit 24. Each of the components 14, 16, 18, 24 and 26 of the trip computer 12 are standard components well known to and easily implemented by those skilled in the art.

In general, the ROM 16 stores a control program that controls the operation of microprocessor 14. Microprocessor 14, in response to the commands of the control program, sends commands through a command bus 20 to the various units ROM 16, RAM 18, counter 26 and input/output unit 24 and transfers data among the units 14, 16, 18, 24 and 26 via bidirectional data bus 22. Portions of RAM 18 may be non-volatile memory to enable a complete power "off" to the trip computer when the vehicle is not in use, also enabling trip computer 12 to incorporate known vehicle odometer functions.

The trip computer 12 may include known functions such as an electronic odometer, a trip odometer and trip timer. Additionally, if communication to the vehicle computer is included, computations regarding fuel consumption, fuel remaining in the vehicle tank and fuel economy may also be implemented by the trip computer 12 in a manner known to those skilled in the art.

In performing odometer and trip odometer functions, a sensor 10 mounted proximate to the output shaft of the vehicle transmission provides a series of pulses on line 28 to the trip computer 12. The frequency of the pulses on line 28 is responsive to the rotation of the output shaft 11 of the vehicle transmission, for example, one pulse with every rotation of the output shaft 11, to thereby indicate vehicle speed. Other known methods of indicating vehicle speed may be used, for example, sensing rotation rate of one or more vehicle wheels and averaging the results.

The pulse signals on line 28, indicative of vehicle speed, are provided to the counter 26. The counter 26 increments its output value based on pulses received along line 28. Through implementation of the control program for a vehicle electronic odometer of the type well known to those skilled in the art, microprocessor 14 is enabled to periodically receive, via bi-directional data bus 22, the counter values from counter 26 and determine, based on the amount of change of periodically received values of counter 26, the vehicle speed. Based on the overall change in counter value, microprocessor 14 can also determine the distance travelled by the vehicle.

In an alternative implementation, line 28 can be directly provided to a microprocessor input port to be processed by the microprocessor in a manner known to those skilled in the art to provide vehicle speed and distance travelled information.

A display 32 is controlled by trip computer 12 via bus 30 and displays the trip computer information including trip mileage (or distance) and, optionally, trip time. If the trip computer 12 is also serving as the vehicle odometer, the display 32 displays the total vehicle miles travelled. A switch 36 is coupled to the computer 12 via line 34 and provides a known function of converting the display format between English and metric. A reset switch 38 is coupled to the computer 12 via line 40 and provides known reset functions. A select switch 37 is coupled to computer 12 via line 39 and provides a known function of changing the display between total odometer distance (i.e., cumulative vehicle mileage) and trip travel distance when depressed by the vehicle operator. Select switch 37 is implemented in trip computers that do not simultaneously display cumulative vehicle travel distance and trip travel distance. The above described trip computer functions are well known to those skilled in the art, are described in various printed publications and/or are available on many production vehicles, and therefore need not be set forth in more detail herein.

Reset switch 38 also controls the retroactive reset function according to this invention. According to this invention, trip computer 12 provides computation of trip mileage accumulated since the last reset of the trip computer caused by operator depression of the reset button 38, other known functions that a designer may desire to implement, and in addition, to achieve the stated advantages of this invention, trip computer 12 is implemented with a retroactive reset function. This retroactive reset function allows retroactive reset of the trip computer during vehicle operation such as driving on a highway to retroactively reset the trip mileage back to the mileage traveled since the last "ignition on" of the vehicle.

Advantageously, the retroactive reset function of this invention allows an operator to reset the trip computer while the vehicle is in operation and after the conventional reset time (i.e., the resets are typically desired before the vehicle starts moving) has passed, allowing the operator to keep track of trip mileage even if the operator has forgotten to reset the trip computer. Advantageously, this invention achieves these advantages without requiring reset of the trip computer with every "ignition off" and "ignition on" of the vehicle.

To implement the retroactive reset into existing hardware, the single reset button 38 is used to control both the conventional reset and retroactive reset functions of the trip computer 12. For example, if the reset button 38 is depressed for a short time period, the trip computer and the display immediately reset to zero. If the reset button 38 is depressed for a longer time period, for example, three seconds or more, the trip computer and the display reset to indicate the mileage (or distance) travelled since the last "ignition on" of the vehicle. Additional functions such as time passed since the last "ignition on" of the vehicle, fuel consumed, fuel economy, etc., can also be reset to values occurring since the last "ignition on" of the vehicle.

Thus, if a vehicle operator using the vehicle and taking a trip starts from the beginning or a place in the middle of the trip when reset is desired without remembering to reset the trip computer, the operator can, when the thought occurs while driving, retroactively reset the trip computer.

In view of the above description of this invention those skilled in the art will recognize that the herein stated advantages of this invention are embodied in the structure comprising means for sensing a signal indicative of vehicle travel, a reset button, a display and a computer controller including a memory, means for receiving the sensed signal, means for updating and storing trip distance traveled responsive to the received signal, means for receiving a reset signal from the reset switch and means for retroactively resetting the trip distance traveled to a value equal to distance travelled since a last vehicle "ignition on" responsive to the reset switch signal and means for controlling the display to display the trip distance traveled.

Figure 2:
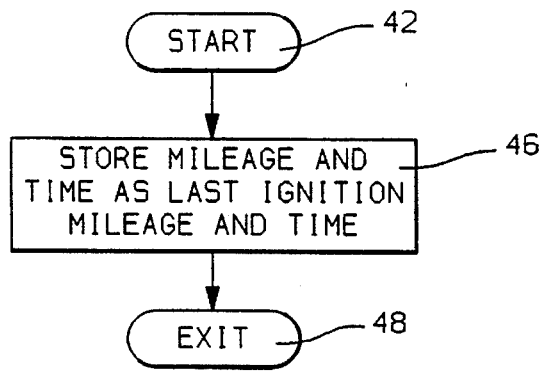
FIGS. 2 and 3 illustrate flow diagrams for use by the microprocessor shown in FIG. 1.

During operation of the vehicle, the trip computer 12 runs software routines stored in the ROM 16 of a type well known to those skilled in the art, to perform the known trip computer functions. Additionally, according to this invention, a routine corresponding to the flow diagram in FIG. 2 may be implemented to store vehicle mileage (or distance information) and time readings at each "ignition on" of the vehicle. With each "ignition on" of the vehicle, the computer starts at block 42. The routine then moves to block 46 where it stores in a block of memory the present mileage of the vehicle, which may either be the present odometer mileage (cumulative) or the present trip computer mileage and the time of start-up. The stored values of the present mileage and present time are referred to as the LAST IGNITION MILEAGE and LAST IGNITION TIME, respectively.

Figure 3:
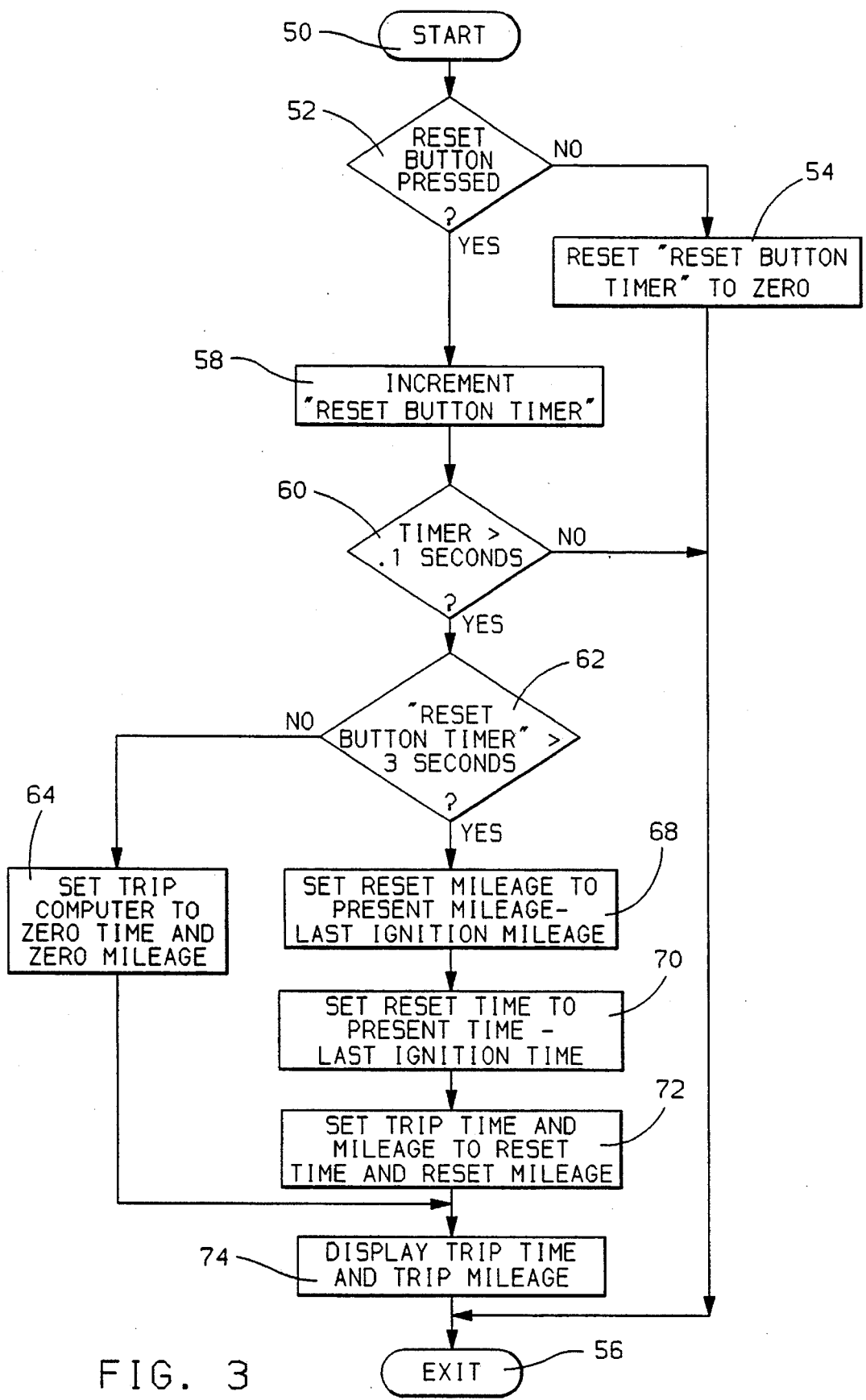

Also, in addition to the routine functions, according to this invention trip computer 12 performs a retroactive reset routine a preferred example of which is illustrated in the flow diagram of FIG. 3. The reset routine is implemented in the main routine of the trip computer to run periodically to allow periodic checking of the reset button. For example, the routine shown in FIG. 3 may run every 100 milliseconds.

The routine in FIG. 3 starts at block 50 and moves to block 52 where it determines if the reset button is depressed. If the reset button is not depressed, the routine moves to block 54 where it resets a value, RESET BUTTON TIMER, to zero. The value RESET BUTTON TIMER keeps track of the time that the reset button 38 (FIG. 1) is depressed. This value is automatically reset to zero during initialization of the computer 12 during startup of the vehicle. After block 54, the routine is exited at block 56.

If the reset button is depressed at block 52, the routine moves from block 52 to block 58. At block 58, the value RESET BUTTON TIMER is incremented and the routine moves to block 60. At block 60, the value RESET BUTTON TIMER is compared to a predetermined threshold, for example, a value corresponding to 0.1 seconds. If the value RESET BUTTON TIMER is not greater than 0.1 seconds, the trip computer does not assume that the depression of the reset button 38 is a legitimate depression and exits the reset routine at block 56. If the value RESET BUTTON TIMER is greater than a value corresponding to 0.1 seconds at block 60, the computer assumes that the depression of the reset button is a legitimate button depression and continues from block 60 to block 62. At block 62, the value RESET BUTTON TIMER is compared to another threshold having a value greater than the value of the threshold used in the comparison at block 60, for example, a threshold value corresponding to 3 seconds. If, at block 62 the value RESET BUTTON TIMER is not greater than 3 seconds, the trip computer assumes that the operator desires a conventional reset of the trip computer and the routine moves from block 62 to block 64.

At block 64, the trip computer sets the TRIP TIME, which is a value representing vehicle trip travel time computed in a conventional manner, and TRIP MILEAGE, which is the trip travel distance computed in a conventional manner, to zero. Block 64 affects a conventional reset of the trip computer. The routine then moves to block 74 where the TRIP TIME and TRIP MILEAGE are sent to the display 32 to reset the display to show the reset TRIP TIME and TRIP MILEAGE. The routine is then exited at block 56. If at block 62 the value RESET BUTTON TIMER was greater than the second threshold, i.e., a value corresponding to 3 seconds, the routine moves from block 62 to block 68 on the assumption that a retroactive reset is desired because of the long depression of the reset button 38.

At block 68, the routine determines a value RESET MILEAGE equal to the PRESENT MILEAGE (the vehicle's current mileage or kilometer reading) subtracted by the LAST IGNITION MILEAGE. This may be determined either with odometer mileage or trip computer mileage as long as one or the other is used for both the PRESENT MILEAGE and the LAST IGNITION MILEAGE.

At block 70, the computer determines RESET TIME equal to the PRESENT TIME minus the LAST IGNITION TIME. The routine then moves to block 72 where it sets the TRIP TIME and TRIP MILEAGE equal to the RESET TIME and RESET MILEAGE. The routine then moves to block 74 where the trip computer 12 controls the display 32 to display the newly computed values of TRIP TIME and TRIP MILEAGE, which are representative of the distance travelled and time passed since the last "ignition on" of the vehicle to thereby affect a retroactive reset of the trip computer display.

The above-described implementation of this invention is an example implementation of the method and apparatus of this invention. Moreover, alternative computer implementations and/or discrete circuit implementations may be apparent to those skilled in the an and are considered equivalent implementations to those set forth herein.

In view of the above described example implementation of this invention as explained with reference to FIG. 3, those skilled in the an will recognize that the practicing of this invention to achieve the above-stated advantages and functions is carried out according to the method of this invention comprising the steps of: (i) receiving a signal indicative of vehicle travel distance, (ii) responsive to the received signal, updating and determining a trip travel distance, (iii) receiving a signal from a reset button and (iv) responsive to the signal received from the reset button, retroactively resetting the trip travel distance to a distance travelled since last "ignition on" of the vehicle and displaying the trip travel distance.

Advantageously, then, those skilled in the an will recognize that this invention is embodied in a method of operating an apparatus for maintaining and indicating trip data for a vehicle comprising the step of, responsive to an operator input, retroactively resetting the trip data to indicate data maintained since an "ignition on" of the vehicle.

Figure 4:
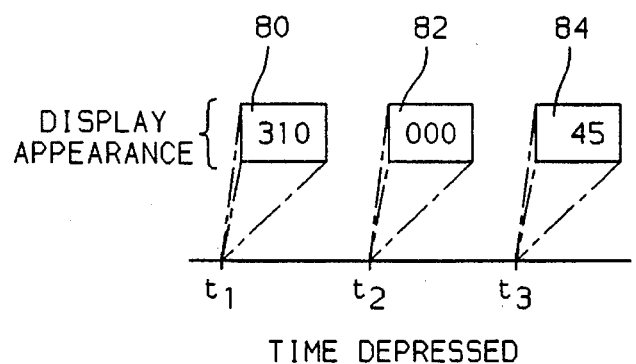
FIG. 4 illustrates an advantageous display function according to this invention.

Referring now to FIG. 4, the apparatus of this invention advantageously provides a new display function for a vehicle trip computer. The trip computer using its conventional functions displays trip mileage accumulated, designated as reference 80. When the reset button is depressed at time $t_1$, the display remains as shown by reference 80 until a first time threshold is passed, for example, 0.1 second. This occurs at time h, at which time the display changes by resetting to zero as indicated by reference 82. If the reset button is maintained depressed for a time period greater than a second threshold, 13, the display again changes, being retroactively reset to the distance travelled since the last "ignition on" of the vehicle, an example of which is indicated by reference 84.

Thus, advantageously, this invention provides a trip computer display function responsive to depression of a reset button wherein when the reset button is depressed for a depression time period less than a first time threshold, a previous trip distance is displayed, when the reset button is maintained depressed wherein the depression time period is greater than the first time threshold but less than a second time threshold that is greater than the first time threshold, a zero trip distance is displayed, and when the reset button is maintained depressed wherein the depression time period is greater than the second time threshold, a retroactive reset trip distance is displayed.

Advantageously, this invention has been described as implemented with a single reset button which provides the advantages of allowing implementation of this invention in a standard electronic trip computer which typically has a reset button. Thus, this invention may be implemented with only a software change. However, if desired, a second button may be provided and designated as the retroactive reset button, in which case, the dual functioning of the first reset button is not required.

According to this invention, the trip computer with the retroactive reset function may be implemented in an electric vehicle. Since a pure electric vehicle has no internal combustion engine, there is not necessarily an "ignition on" signal. To implement this invention and indicate the point in time of the last stop of the vehicle, the trip computer can store in memory mileage and time information each time the main power circuit of the electric vehicle is enabled. When the retroactive reset function of this invention is selected, then, the trip mileage and travel time are retroactively reset to the distance traveled and travel time occurring since the last activation of the main power circuit. Alternatively, the retroactive reset function of this invention may be implemented so that the trip travel distance and travel time are retroactively reset to the distance traveled and travel time occurring since the last battery charging of the vehicle.

The above-described implementations of this invention are example implementations. Moreover, various other improvements and modifications to this invention may occur to those skilled in the art and will fall within the scope of this invention as set forth below.

The embodiments of the invention in which an exclusive property or privilege is claimed are defined as follows:

1. A method of operating an apparatus for maintaining and indicating trip data for a vehicle comprising the step of, responsive to an operator input, retroactively resetting the trip data to indicate data maintained since an ignition on of the vehicle.

2. An apparatus comprising:

means for sensing a signal indicative of vehicle travel;

a reset button;

a display;

a computer controller coupled to the means for sensing, the reset button and the display, the computer controller including a memory, means for receiving the sensed signal, means for updating and storing trip distance traveled responsive to the received signal, means for receiving a reset signal from the reset switch and means for retroactively resetting the trip distance traveled to a value equal to distance travelled since a last vehicle ignition on responsive to the reset signal and means for controlling the display to display the trip distance traveled.

3. A method of maintaining and indicating vehicle travel data comprising the steps of:

receiving a signal indicative of vehicle travel distance;

responsive to the received signal, updating and determining a trip travel distance;

receiving a signal from a reset button; and responsive to the signal received from the reset button, retroactively resetting the trip travel distance to a distance travelled since a previous point in time; and displaying the trip travel distance.

4. The method of claim 3 wherein the previous point in time is a previous ignition on of the vehicle.

5. The method of claim 4, also comprising the steps of:

receiving a signal indicative of vehicle travel time; and responsive to the signal received from the reset button, retroactively resetting the vehicle travel time to a time passed since a previous ignition on of the vehicle.

6. A method of displaying information on a trip computer comprising the steps of:

responsive to a depression of a reset button and wherein the depression is for a depression time period less than a first time threshold, maintaining a present display of trip distance;

responsive to the depression of the reset button and wherein the depression time period is greater than the first time threshold but less than a second time threshold that is greater than the first time threshold, resetting the present display of trip distance to zero; and responsive to the depression of the reset button and wherein the depression time period is greater than the second time threshold, retroactively resetting the present display of trip distance to a distance traveled since a previous point in time.

\* \* \* \* \*